(12) United States Patent
Kim

(10) Patent No.: US 6,342,923 B1
(45) Date of Patent: Jan. 29, 2002

(54) VIDEO FORMAT CONVERTING APPARATUS

(75) Inventor: Seo-Kyu Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/220,578

(22) Filed: Dec. 23, 1998

(30) Foreign Application Priority Data

Dec. 24, 1997 (KR) .............................. 97-73631

(51) Int. Cl.[7] .......................... H04N 7/01; H04N 11/20; H04N 11/22
(52) U.S. Cl. ......................... 348/458; 348/441
(58) Field of Search .............................. 348/441, 443, 348/455, 458; H04N 7/01, 11/20, 11/22

(56) References Cited

U.S. PATENT DOCUMENTS

| | | | | |
|---|---|---|---|---|
| 4,694,337 A | | 9/1987 | Lyons ..................... 358/140 |
| 4,751,573 A | * | 6/1988 | Kubota ..................... 358/140 |
| 5,159,437 A | | 10/1992 | Lee ........................ 358/11 |
| 5,349,385 A | * | 9/1994 | Glenn ..................... 348/458 |
| 5,404,169 A | | 4/1995 | Bae ........................ 348/443 |
| 5,585,856 A | * | 12/1996 | Nakaya et al. ............. 348/441 |
| 5,594,499 A | * | 1/1997 | Watanabe et al. ........... 348/222 |
| 5,754,243 A | * | 5/1998 | Kurihara et al. ........... 348/445 |
| 5,798,792 A | * | 8/1998 | Kusaka et al. ............. 348/264 |
| 5,914,753 A | * | 6/1999 | Donovan ................... 348/441 |
| 6,088,062 A | * | 7/2000 | Kanou et al. .............. 348/441 |
| 6,128,036 A | * | 10/2000 | Sakurai et al. ............ 348/222 |
| 6,144,412 A | * | 11/2000 | Hirano et al. ............. 348/441 |

* cited by examiner

Primary Examiner—Reinhard J. Eisenzopf
Assistant Examiner—Brian P. Yenke
(74) Attorney, Agent, or Firm—Sughrue Mion, PLLC

(57) ABSTRACT

A system which can perform video communications via terminals which can send and receive video and audio signals should convert a video signal format set in each terminal into a common intermediate format (CIF) to then perform encoding and decoding operations. A video format converting apparatus can reduce the size of line memories which are used for video format conversion during converting an image picked up by a charge coupled device (CCD) camera into a CIF image. Thus, the number of line memories used for video format conversion of images can be reduced, thereby providing an effect capable of reducing the size of an integrated circuit of the line memories. The video format converting apparatus can be also applied to convert an NTSC signal as well as the CCD image into the CIF image.

6 Claims, 3 Drawing Sheets

VIDEO FORMAT CONVERTING APPARATUS

BACKGROUND OF THE INVENTION

The present invention relates to a video format converting apparatus, and more particularly, to a video format converting apparatus capable of reducing the number of the line memories which are used when a charge coupled device (CCD) image is converted into a common intermediate format (CIF) image set between respective terminals thereof, to thereby reduce the size of an integrated circuit (IC) of line memories.

In general, a video communications system sends and receives video and voice signals between two locations apart from each other via respective terminals which can send and receive video and audio signals, and allows users located remotely from each other to communication with each other while viewing each other as the case that they are all in the same place. In the video communications system, a CIF is utilized to enable terminals to communicate with each other without considering a video signal system relating to the number of frames to be transmitted per second or the number of scanning lines of a screen. Therefore, each of terminals employing a different video signal system converts a video signal to be transmitted into a CIF to perform an encoding operation, and inversely converts the encoded video signal into a signal which is adapted to a video signal system of the terminal during decoding. In this manner, it is possible to perform video communications between mutually different types of terminals.

A CCD camera is usually used as a pickup device for a video communications system. A vertical resolution of a CCD image picked up in the CCD camera is 240 lines. On the other hand, a vertical resolution of a CIF image which is used in a video communications field is 288 lines. Thus, in order to perform video communications, the CCD image should be converted into the CIF image. That is, a video signal of 240 lines should be converted into a video signal of 288 lines. As a result, a video format converting apparatus for converting a video signal having a vertical resolution of 240 lines into that of 288 lines requires a number of line memories, which causes an IC integrated with the line memories to be larger in size.

SUMMARY OF THE INVENTION

To solve the above problems, it is an object of the present invention to provide a video format converting apparatus which can allow implementation of a video communications system capable of reducing the number of line memories which are used for converting a video format of an image, to thereby reduce the size of an IC of line memories.

To accomplish the above object of the present invention, there is provided a video format converting apparatus for use in a video communications system, the video format converting apparatus comprising:

a first line memory for delaying input line image data by a predetermined interval of time and outputting delayed line image data; a first coefficient generator for generating a first weighted coefficient corresponding to the delayed line image data output from the first line memory; a second coefficient generator for generating a second weighted coefficient corresponding to the input line image data; line interpolation means for generating interpolated line image data from the input line image data and the delayed line image data, using the first and second weighted coefficients; a second line memory for delaying the interpolated line image data by the predetermined interval of time; a multiplexer for selecting one of the outputs of the first and second line memories and outputting the selected one; and a controller for controlling the operations of the first and second coefficient generators and the multiplexer so that line image data of a second video format having a second number of lines is output with respect to the input line image data of the first video format having a first number of lines.

BRIEF DESCRIPTION OF THE DRAWINGS

The above object and other advantages of the present invention will become more apparent by describing in detail the structure and operation of the present invention with reference to the accompanying drawings, in which.

DETAILED DESCRIPTION OF THE PREFERRED EMBODIMENT

A preferred embodiment of the present invention will be described in detail with reference to the accompanying drawings.

Figure 1:
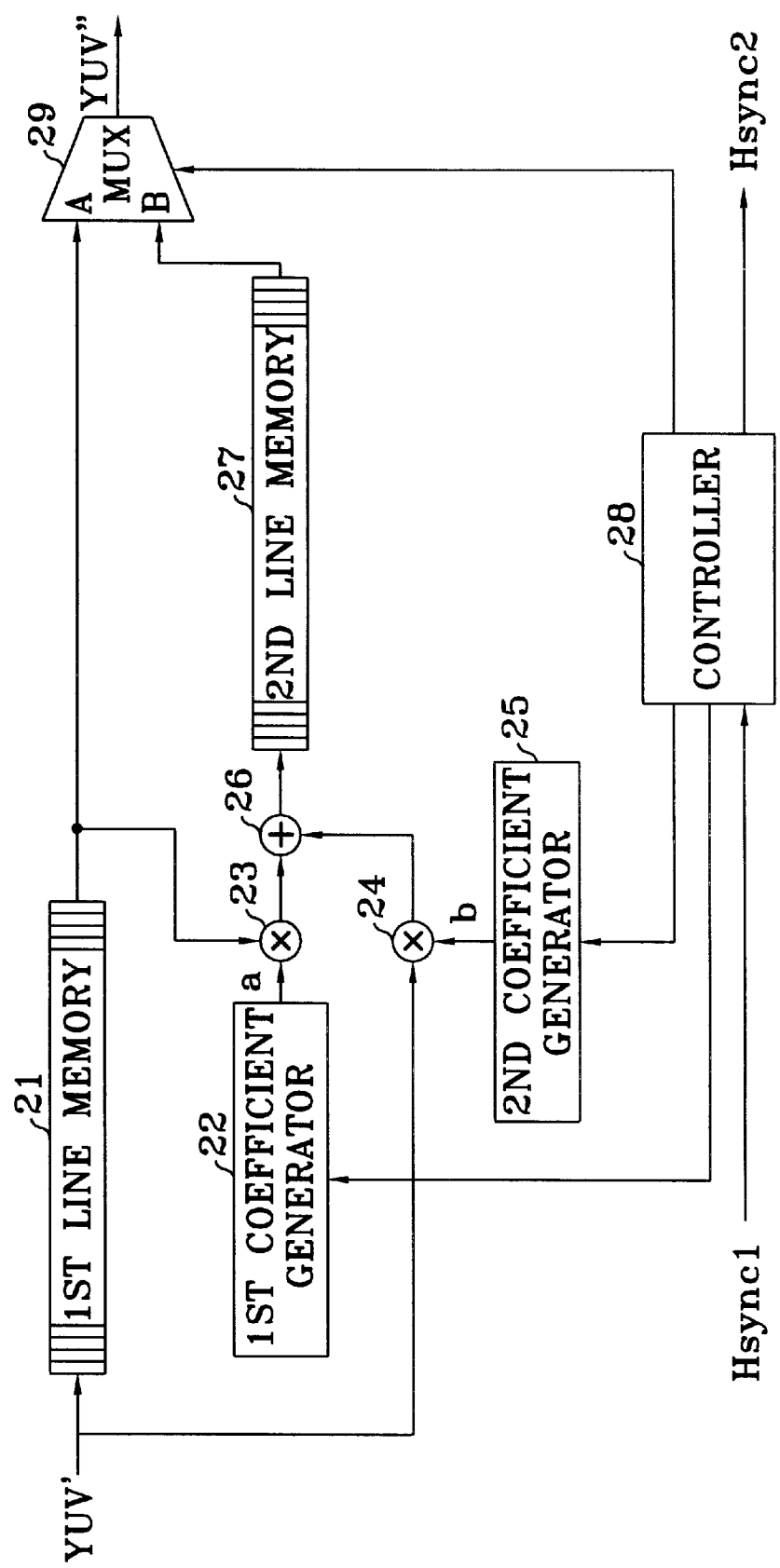
FIG. 1 is a block diagram showing a video format converting apparatus according to a preferred embodiment of the present invention.

Referring to FIG. 1, a video format converting apparatus includes a first line memory 21 and a second line memory 27. The first line memory 21 stores input line image data and the second line memory 27 stores interpolated line image data. A 5-to-6 conversion is required in order to convert image data of 240 lines into that of 288 lines. That is, five-line data should be converted into six-line data. In this embodiment, a weighted linear interpolation method is used, which is generally used for conversion of resolution. Weighted coefficients for weighted linear interpolation are generated in coefficient generators 22 and 25, respectively. Multipliers 23 and 24 are connected to the respective coefficient generators 22 and 25 and multiply input line image data YUV' by coefficients supplied from the coefficient generators 22 and 25. An adder 26 adds the outputs of the multipliers 23 and 24, to accordingly obtain interpolated line image data. A multiplexer (MUX) 29 selects one of the input line image data and the interpolated line image data. A controller 28 generates a horizontal sync signal Hsync2 of the converted line image data based on a horizontal sync signal Hsync1 of the input line image data, and controls the operations of the coefficient generators 22 and 25 and the MUX 29.

Figure 2:
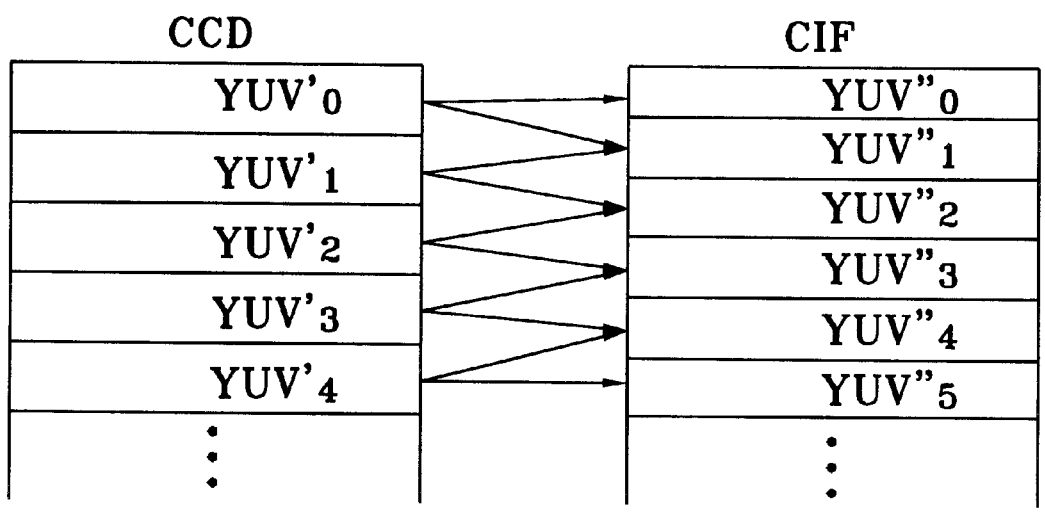
FIG. 2 is a view for illustrating a process that input image data of 5 lines having a CCD video format is converted into line image data of 6 lines having a CIF.

FIG. 2 is a view for illustrating a process that input image data of 5 lines having a CCD video format is converted into line image data of 6 lines having a CIF. A line conversion relationship between a CCD image and a CIF image shown in FIG. 2 is expressed as the following equations (1) to (6).

$$YUV_0'' = YUV_0' \quad (1)$$

$$YUV_1'' = a_1 \times YUV_0' + b_1 \times YUV_1', \ a_1 + b_1 = 1 \quad (2)$$

$$YUV_2'' = a_2 \times YUV_1' + b_2 \times YUV_2', \ a_2 + b_2 = 1 \quad (3)$$

$$YUV_3'' = a_3 \times YUV_2' + b_3 \times YUV_3', \ a_3 + b_3 = 1 \quad (4)$$

$$YUV_4''=a_4 \times YUV_3'+b_4 \times YUV_4', a_4+b_4=1 \quad (5)$$

$$YUV_5''=YUV_4' \quad (6)$$

In each equation, "a" and "b" denote a conversion coefficient, respectively in which a+b=1.

Figure 3:
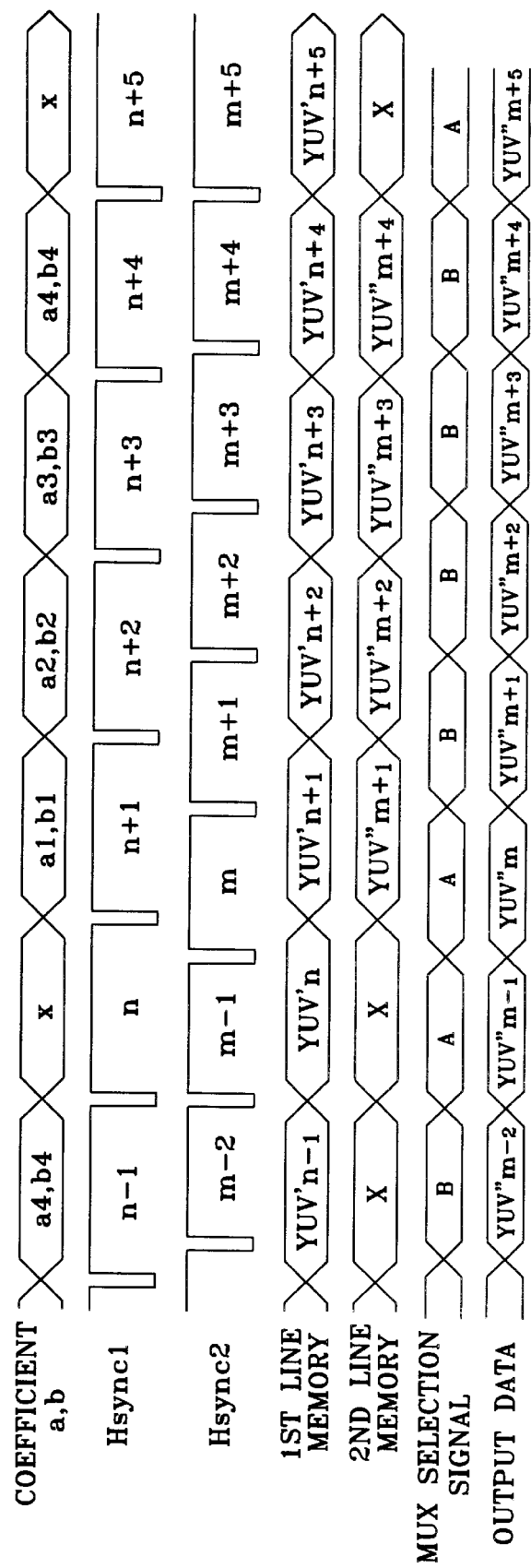
FIG. 3 is a timing diagram for explaining an operation timing of a respective portion of the apparatus as shown in FIG. 1.

The operation of the apparatus of FIG. 1 will be described below with reference to FIGS. 2 and 3.

The input line image data YUV' is input to the first line memory 21 and the second multiplier 24. The horizontal sync signal Hsync1 corresponding to the input image data YUV' is input to the controller 28. The first line memory 21 delays the input line image data YUV' by a predetermined interval of time and outputs the delayed result. Here, the predetermined interval of time is determined by the line image data according to the CIF. The controller 28 controls the first coefficient generator 22, the second coefficient generator 25 and the MUX 29, based on the horizontal sync signal Hsync1 of the input line image data YUV'. The first coefficient generator 22 generates a first coefficient "a" corresponding to the output of the first line memory 21 and the second coefficient generator 25 generates a second coefficient "b" corresponding to the input line image data YUV', under the control of the controller 28.

The first multiplier 23 multiplies the output of the first coefficient generator 22 by the output of the first line memory 21, and supplies the multiplied result to the adder 26. The second multiplier 24 multiplies the output of the second coefficient generator 25 by the input line image data YUV', and supplies the multiplied result to the adder 26. The adder 26 adds the outputs of the first multiplier 23 and the second multiplier 24, and supplies the added result to the second line memory 27. As a result, the interpolated line image data is stored in the second line memory 27. The second line memory 27 delays the input data by the predetermined interval of time and outputs the delayed result. The controller 28 generates a horizontal sync signal Hsync2 based on the horizontal sync signal Hsync1, and controls a switching operation of the MUX 29 with an interval of time coincident with the period of the horizontal sync signal Hsync2. The selection signal supplied to the MUX 29 is shown in FIG. 3. The MUX 29 selects the output of the line memory 21 or 27 while satisfying the equations (1) through (6).

As described above, the present invention uses two line memories in order to convert the image picked up by a CCD camera into a CIF image, to accordingly provide an effect capable of reducing the size of the IC of with the line memories. The present invention can be also applied to convert an NTSC image as well as a CCD image into a CIF image.

While only a certain embodiment of the invention has been specifically described herein, it will be apparent that numerous modifications may be made thereto without departing from the spirit and scope of the invention.

What is claimed is:

1. A video format converting apparatus for use in a video communications system, the video format converting apparatus comprising:
   a first line memory for receiving and delaying by a predetemnined interval of time input line image data of a first video format and outputting delayed line image data;
   a first coefficient generator for generating a first weighted coefficient corresponding to the delayed line image data output from the first line memory;
   a second coefficient generator for generating a second weighted coefficient corresponding to the input line image data;
   line interpolation means for receiving the input line image data and the delayed line image data from the first lime memory and generating interpolated line image data from the input line image data and the delayed line image data in accordance with the first and second weighted coefficients;
   a second line memory for receiving and delaying by the predetermined interval of time the interpolated line image data and outputting delayed interpolated line image data;
   a multiplexer for receiving and selectively outputting one of the delayed line image data output by the first line memory and the delayed interpolated line image data output by the second line memory; and
   a controller for controlling the first and second coefficient generators and the multiplexer to convert the input line image data of the first video format having a first number of lines to line image data of a second video format having a second number of lines;
   wherein the controller controls the multiplexer so that the delayed line image data output by the first line memory is selected as a first line and a last line of the second number of lines, and the delayed interpolated line image data output by the second line memory is selected as remaining lines other than the first and last lines among the second number of lines.

2. The video format converting apparatus according to claim 1, wherein said predetermined interval of time is determined based on the second video format.

3. The video format converting apparatus according to claim 2, wherein said controller generates a second horizontal sync signal for the line image data of the second video format based on a first horizontal sync signal for the input line image data of the first video format, and said multiplexer performs a selection operation between the outputs of said first and second line memories by an interval of time coincident with a period of the second horizontal sync signal.

4. The video format converting apparatus according to claim 3, wherein said first video format is a charge coupled device (CCD) video format for the video data obtained by a CCD camera and said second video format is a common intermediate format (CIF).

5. The video format converting apparatus according to claim 4, wherein said controller controls the first and second coefficient generators and the multiplexer to convert input image data of five lines having the CCD video format into line image data of six lines having the CIF format.

6. The video format converting apparatus according to claim 1, wherein said line interpolation means comprises
   a first multiplier for multiplying the input line image data by the first weighted coefficient output from the first coefficient generator and outputting the multiplied result;
   a second multiplier for multiplying the delayed line image data output from said first line memory by the second weighted coefficient output from said second coefficient generator and outputting the multiplied result; and
   an adder for adding the outputs of said first and second multipliers and outputting the added result to said second line memory.

* * * * *